3,565,629
TWO-COMPONENT DIAZOTYPE
INTERMEDIATE MATERIAL
Gerhard Usbeck, Wiesbaden-Freudenberg, and Hellmut Ziegler, Wiesbaden-Bierstadt, Germany, assignors, by mesne assignments, to Keuffel & Esser Company, Hoboken, N.J.
No Drawing. Filed Oct. 6, 1967, Ser. No. 673,291
Claims priority, application Germany, Oct. 18, 1966,
K 60,482
Int. Cl. G03c 1/54, 1/58
U.S. Cl. 96—91                                5 Claims

ABSTRACT OF THE DISCLOSURE

Diazotype intermediate material providing images of good actinic opacity and visible contrast is prepared by combining alkyl aralkyl amino benzene diazonium derivatives with hydroxy benzoic acid- or phenylurea-derivative and naphthoic acid amide-derivative azo coupler compounds, and including a sulfo-benzoic acid-derivative stabilizer. The resulting two-component diazotype material, although containing a fast-developing diazonium compound and a blue-coupling component, has remarkable storage stability and actinic opacity.

BACKGROUND OF THE INVENTION

In the diazotype art, efforts are being made in the preparation of intermediate copies to produce color shades which have a good actinic opacity and covering capacity, i.e. absorb particularly in the wave length range emitted by the light sources normally used in diazotype photoprinting apparatus. Yellow to brownish dyestuffs having an absorption range between 3330 and 4400 A. are suitable for this purpose. However, these color shades are relatively light and have the disadvantage that they produce a low visual contrast, so that an immediate control of the intermediate copies produced is rendered difficult.

For this reason, mixtures of yellow to yellow-green coupling azo or coupling components with azo components yielding brown to reddish-brown dyestuffs are normally used, so that somewhat darker lines which are richer in contrast are produced.

Further, attempts have been made to improve the visual contrast by the addition of blue-coupling components. However, while a distinct improvement of the contrast could be achieved with a certain amount of blue-coupling component, there resulted also a considerable reduction of the background transparency of the print and the actinic opacity of the lines. Moreover, the blue dyestuffs have the disadvantage that, when present in excess of a certain concentration, they can no longer be decolorized for correction purposes by means of reducing agents, such as $SnCl_2$ solutions. So far, these drawbacks have largely precluded the use of blue-coupling components as contrast-improving additives to materials for intermediate copies.

It is known to use unilaterally diazotized derivatives of p-phenylene diamine with a tertiary amino group as diazo compounds for the preparation of intermediate materials. As a rule, previous two-component materials have been restricted to the employment of slowly coupling dialkyl amino derivatives, while the more readily coupling diazo compounds with aromatically substituted radicals at the amino nitrogen atom or with heterocyclic substituents attached via a nitrogen atom at the p-position, are more suitable for the one-component material which has the azo coupling component applied to it with the developer.

Further, it is known to use phenols and naphthols as coupling components, e.g. resorcylic acid derivatives as brown-coupling components, hydroxyphenyl urea compounds as yellow-coupling components, and 2-hydroxy-3-naphthoic acid amides as blue-coupling components.

Normally, actinically transparent base materials are used as layer supports for intermediate materials, e.g. naturally transparent or transparentized papers, transparent papers which have been lacquered with acetyl cellulose lacquers, acetyl cellulose films, or other films which permit a diffusion sensitization.

SUMMARY OF THE INVENTION

Now it has been found that, unexpectedly, intermediate copies which possess good covering capacity, i.e. actinic opacity, and, at the same time, are visibly rich in contrast are obtained by using compounds of Formula I wherein $R_1$ stands for a lower alkyl radical, $R_2$ for an aralkyl radical with up to 10 carbon atoms, and X for the anion of the diazonium compound, as light-sensitive diazo compounds, in combination with compounds of Formula II wherein $R_1$ stands for —COX or —NHCONH$_2$, X being —OH, —OCH$_3$, —OC$_2$H$_5$, —NH$_2$, —N(CH$_3$)$_2$, —N(C$_2$H$_5$)$_2$ or —NHCH$_2$CH$_2$OH, $R_2$ stands for —H or —OH, $R_3$ stands for —H or halogen, and $R_2$ is OH when $R_1$ stands for —COX, as coupling components for sensitizing the diazotype material.

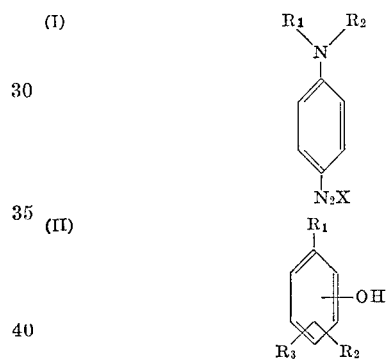

(I)

(II)

Advantageously, the diazo component is mixed, at a ratio by weight of 6:1 to 1:1, with a further compound corresponding to Formula I wherein, however, $R_1$ and $R_2$ form a 5- or 6-membered heterocyclic radical with the nitrogen atom to which they are attached.

The material of the invention additionally contains an amount not more than 25 percent by weight of the total quantity of coupling component present, of a blue-coupling component of Formula III wherein $R_1$ stands for H, lower alkyl or hydroxy alkyl, $R_2$ stands for lower alkyl, hydroxy alkyl, amino alkyl, pyrrolidino alkyl, morpholino alkyl or piperazino alkyl, or $R_1$ and $R_2$ together with the nitrogen atom to which they are attached form a 5- or 6-membered heterocycic radical.

(III)

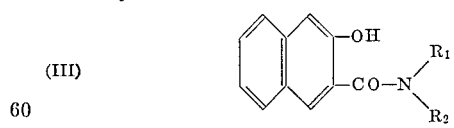

Terms such as "lower alkyl groups" are meant to designate generally straight-chained or branched groups having not more than 5 carbon atoms. The anion of the diazonium salt may be derived from any acid known to be suitable for this purpose, e.g. hydrohalic acids, tetrafluoboric acid, hexafluophosphoric acid etc. The diazonium salts may also be used in known manner in the form of their double salts, e.g. with zinc chloride, cadmium chloride, or stannic chloride.

By means of the combination of diazo compounds and coupling components according to the present invention, intermediate copies are obtained which possess dark-brown lines of good covering power combined with good transparency of background. The visual contrast is further improved by adding blue-coupling components of Formula III to the sensitizing mixture. As long as the proportion of the blue-coupling component does not exceed the limit stated above, the lines of the transparency copy produced can be easily decolorized with $SnCl_2$— solutions and thus corrected.

Surprisingly, materials of satisfactory storability can be produced by means of the relatively fast-coupling alkyl aralkyl amino benzene diazonium compounds or heterocyclically substituted benzene diazonium compounds used in the present case, which had been generally regarded hitherto as unsuitable for use in two-component material, by including with the organic and inorganic acids normally added to diazotype materials as stabilizers, such as citric acid, tartaric acid, naphthalene-1,3,6-trisulfonic acid (sodium salt), boric acid, and the like, a substituted benzene sulfonic acid, e.g. 2-hydroxy-5-sulfobenzoic acid.

The materials according to the invention, in particular the ones which contain additives of diazonium compounds having heterocyclic substituents attached via a nitrogen atom to the p-position, are distinguished by a particularly effective initial development, i.e. by the formation of well defined image areas immediately at the beginning of the developing process, such as could not be achieved hitherto in combination with the good storage quality mentioned above.

Suitable supports for the light-sensitive layers are the above mentioned customary transparent base materials.

The sensitizing mixtures may be applied to the support in known manner, viz from aqueous solutions or from solutions in mixtures of water and water-miscible organic solvents, to which organic solvents which are not miscible with water may be added, if desired.

PREFERRED EMBODIMENTS

The following examples describe the preparation of preferred materials according to the invention:

Example 1

A support of naturally transparent paper was coated with a solution containing

|  | G. |
|---|---|
| Tartaric acid | 1.0 |
| Naphthalene-1,3,6-trisulfonic acid (sodium salt) | 1.0 |
| Thiourea | 2.0 |
| Boric acid | 0.5 |
| 2-hydroxy-5-sulfobenzoic acid | 0.2 |
| 2,4-dihydroxy-benzoic acid | 1.0 |
| 3-hydroxy-phenyl urea | 2.0 |
| 2 - hydroxy - 3 - naphthoic acid - N - (3 - morpholino propyl)-amide | 0.6 |
| 4 - diazo - N - benzyl - N - ethyl - aniline (zinc chloride double salt) | 3.0 |
| 4 - diazo - 1 - morpholino - benzene (zinc chloride double salt) | 1.0 |
| Zinc chloride | 1.0 | in 15 ml. of isopropanol and 80 ml. of water. Excess solution was removed in the normal manner and the paper was dried. After exposure under a master and development by means of ammonia vapors, an intermediate copy with dark-brown, almost black lines of good contrast was obtained which had a very good covering capacity and was very suitable for further copying.

Similar results were obtained when using transparentized paper as the support.

When the 4-diazo-N-benzyl-N-ethyl-aniline was replaced by the same quantity of 4-diazo-N,N-dimethyl-aniline (zinc chloride double salt) or 4-diazo-N,N-diethyl-aniline (zinc chloride double salt) or 4-diazo-2-methyl-N-ethyl-aniline (zinc chloride double salt) copies with brown to brown-red lines and distinctly inferior contrasts were obtained.

After a storage of three months at temperatures of 20 to 25° C., the light-sensitive material prepared in accordance with the invention showed no deterioration. The corresponding materials containing 4-diazo-N,N-diethyl-aniline or 4-diazo-N-ethyl-2-methyl-aniline instead of 4-diazo-N-ethyl-N-benzyl-aniline showed signs of aging and decomposition after the same period of time, which became evident in a partial beginning of coupling, poorer transparency, and reduced gradation and covering power. When stored at elevated temperature, the material according to the invention withstood the stress about twice as well as the control material.

Example 2

Naturally transparent paper provided with a cellulose acetate lacquer (about 50 to 54 percent of $CH_3COOH$) weighing approximately 10 to 20 g./m.$^2$ was coated with a solution containing

|  | G. |
|---|---|
| Tartaric acid | 1.0 |
| Thiourea | 2.0 |
| Naphthalene-1,3,6-trisulfonic acid (sodium salt) | 0.5 |
| Boric acid | 1.0 |
| 2-hydroxy-5-sulfobenzoic acid | 0.2 |
| 2,4-dihydroxy-benzoic acid-ethanol amide | 1.0 |
| 2,4-dihydroxy-benzoic acid amide | 1.0 |
| 2 - hydroxy - 3 - naphthoic acid - N - (3 - morpholino-propyl)-amide | 0.2 |
| 4 - diazo - N - benzyl - N - ethyl - aniline (zinc chloride double salt) | 3.0 |
| 4 - diazo - 1 - morpholino - benzene (zinc chloride double salt) | 1.0 | in 40 ml. of water and 50 ml. of isopropanol, the excess of the solution was removed in the usual manner, and the material dried. After exposure under a master and development by means of ammonia vapors, an intermediate copy was obtained which showed excellently readable dark-brown lines of good covering power on a highly transparent background.

When the 4-diazo - N - benzyl-N-ethyl - aniline was replaced by 4-diazo-N,N-dimethyl-aniline (zinc chloride double salt) or 4-diazo-N,N-diethyl-aniline (zinc chloride double salt) or 4-diazo-2-methyl-N-ethyl-aniline (zinc chloride double salt) or 4-diazo-3-ethoxy-N,N-diethyl-aniline (zinc chloride double salt) copies with light-brown lines of considerably lower contrast were obtained.

Example 3

A cellulose acetate film having an acetyl content of 50 to 54 percent (calculated as $CH_3COOH$) was coated with a solution containing

|  | G. |
|---|---|
| Tartaric acid | 1.0 |
| Boric acid | 0.5 |
| 3,5-dihydroxy-benzoic acid methyl ester | 1.0 |
| 3-hydroxy-phenyl urea | 2.0 |
| 2-hydroxy-3 - naphthoic acid - N - (3 - morpholino-propyl)-amide | 0.6 |
| 2-hydroxy-5-sulfobenzoic acid | 0.2 |
| 4-diazo-N - benzyl - N - ethyl-aniline (zinc chloride double salt) | 3.0 |
| 4-diazo-1-morpholino benzene | 1.0 |
| Thiourea | 2.0 | in 40 ml. of water, 50 ml. of isopropanol, and 3 ml. of glacial acetic acid, excess solution was removed in the normal manner, and the material dried.

After exposure under a master and development by means of ammonia vapors, an intermediate copy with dark brown lines of good covering power and contrast was obtained.

When the 4-diazo-N-benzyl-N-ethyl-aniline was replaced by 4-diazo - N,N - diethyl - aniline (zinc chloride double salt) or 4-diazo-N,N-dimethyl-aniline (zinc chloride double salt), or 4-diazo-2-methyl-N-ethyl-aniline (zinc chloride double salt), or 4-diazo-3-ethoxy-N,N-diethyl-aniline (zinc chloride double salt), copies of a lighter brown shade and distinctly lower contrast were obtained.

Example 4

A naturally transparent paper provided with a cellulose acetate lacquer (50 to 54 percent of $CH_3COOH$) weighing from 10 to 20 g./m.$^2$ was coated with the following solution, excess solution was removed in a suitable manner, and the material dried:

|  | G. |
|---|---|
| Tartaric acid | 1.0 |
| Thiourea | 2.0 |
| Naphthalene-1,3,6-trisulfonic acid (sodium salt) | 0.5 |
| Boric acid | 1.0 |
| 2,4-dihydroxy-benzoic acid ethanol amide | 1.0 |
| 3-hydroxy-phenyl urea | 2.0 |
| 2-hydroxy-5-sulfobenzoic acid | 0.2 |
| 2-hydroxy-3-naphthoic acid - N - (3-morpholinopropyl)-amide | 0.2 |
| 4-diazo - N - benzyl - N - ethyl-aniline (zinc chloride double salt) | 4.0 | in 45 ml. of water, 50 ml. of isopropanol, and 2 ml. of formic acid.

After exposure under a master, development by means of ammonia vapors produced very dark brown lines of good contrast and covering power on a background of good transparency.

Example 5

Rag paper which had been artificially transparentized was coated with a solution containing

|  | G. |
|---|---|
| Tartaric acid | 1.0 |
| Thiourea | 2.0 |
| Boric acid | 0.5 |
| Naphthalene-1,3,6-trisulfonic acid (sodium salt) | 1.0 |
| 2-hydroxy-5-sulfobenzoic acid | 0.2 |
| 3-hydroxy-phenyl urea | 1.0 |
| 2,4-dihydroxy-benzoic acid ethanol amide | 1.0 |
| 4-diazo - N - benzyl - N-ethyl-aniline (zinc chloride double salt) | 1.8 |
| Zinc chloride | 1.0 | in 80 ml. of water and 15 ml. of isopropanol, the excess of the solution was removed in the usual manner, and the material dried.

After exposure under a master and development with ammonia vapors, the coated material yielded dark brown lines with good covering power and contrast.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Two-component diazotype material comprising a support and a coating thereon of a light-sensitive composition comprising:
   (a) a light-sensitive diazonium compound of the general formula

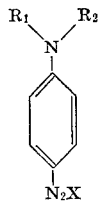

wherein
$R_1$ stands for a lower alkyl radical,
$R_2$ stands for an aralkyl radical with up to 10 carbon atoms, and
X stands for the anion of the diazonium compound;
(b) at least two different azo coupling components from the group consisting of the compounds having the general formula

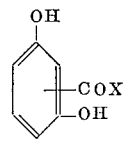

wherein X stands for —OH, —OCH$_3$, —OC$_2$H$_5$, —NH$_2$, —N(CH$_3$)$_2$, —N(C$_2$H$_5$)$_2$, or

—NHCH$_2$CH$_2$OH and 3-hydroxy-phenyl urea; and
(c) a blue azo coupling component of the general formula

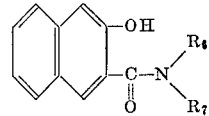

wherein
$R_6$ stands for a hydrogen atom, a lower alkyl, or a hydroxyalkyl radical,
$R_7$ stands for a lower alkyl, hydroxyalkyl, aminoalkyl, pyrrolidinoalkyl, morpholinoalkyl or piperazinoalkyl radical, or
$R_6$ and $R_7$ and the nitrogen atom to which they are attached form a 5- or 6-membered saturated heterocyclic ring; and
(d) an acidic stabilizing agent.

2. Material according to claim 1 wherein said stabilizing agent is 2-hydroxy-5-sulfobenzoic acid.

3. Material according to claim 1 which additionally comprises in said composition, in an amount between about .02 and 1.0 part per part of said diazonium compound, a light-sensitive p-morpholino benzene diazonium compound.

4. Material according to claim 1 wherein an amount of less than 25% by weight of the total weight of azo coupling component employed in the said composition is the said blue azo coupling component.

5. Material according to claim 4 which additionally comprises in said composition in an amount of between about 0.2 and 1.0 part for part of said diazonium compound, a light-sensitive p-morpholino benzene diazonium compound.

References Cited
UNITED STATES PATENTS

| 2,416,773 | 3/1947 | Reichel | 96—91 |
| 3,473,930 | 10/1969 | Werner et al. | 96—91 |
| 3,498,791 | 3/1970 | Rauhut et al. | 96—91 |
| 2,233,038 | 2/1941 | Sus et al. | 96—91 |
| 2,467,358 | 4/1949 | Neumann | 96—91X |
| 2,485,122 | 10/1949 | Von Glohn et al. | 96—91X |
| 2,496,240 | 1/1950 | Von Glohn et al. | 96—91 |
| 2,717,832 | 9/1955 | Sulich | 96—91 |

(Other references on following page)

UNITED STATES PATENTS

| | | | |
|---|---|---|---|
| 3,052,542 | 9/1962 | Sulich | 96—91X |
| 3,113,025 | 12/1963 | Bialozak | 96—49X |
| 3,123,472 | 3/1964 | Wilders et al. | 96—49 |
| 3,248,220 | 4/1966 | Van Rhijn | 96—91 |
| 3,255,010 | 6/1966 | Sus et al. | 96—91X |
| 3,331,690 | 7/1967 | Pope et al. | 96—91 |
| 3,404,005 | 10/1968 | Tobey | 96—91 |
| 3,408,203 | 10/1968 | Sus et al. | 96—91 |

FOREIGN PATENTS

| | | | |
|---|---|---|---|
| 708,151 | 4/1954 | Great Britain | 96—49 |
| 867,432 | 5/1961 | Great Britain | 96—91 |

NORMAN G. TORCHIN, Primary Examiner

C. L. BOWERS, Jr., Assistant Examiner

U.S. Cl. X.R.

96—49